United States Patent
Zeiler et al.

(10) Patent No.: US 6,301,789 B1
(45) Date of Patent: Oct. 16, 2001

(54) CIRCULAR SAW

(75) Inventors: Jeffrey M. Zeiler, Pewaukee; Brian P. Wattenbach, Glendale; Richard P. Brault, Cedarburg; Jeffrey S. Holly, Menomonee Falls; Jeffrey C. Hessenberger, Neosho; Thomas P. James, Oconomowoc, all of WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

(21) Appl. No.: 09/374,500

(22) Filed: Aug. 13, 1999

Related U.S. Application Data

(60) Provisional application No. 60/096,522, filed on Aug. 14, 1998.

(51) Int. Cl.⁷ .................................................. B23D 47/00
(52) U.S. Cl. ............................................. 30/388; 30/374
(58) Field of Search .......................... 30/376, 375, 388, 30/390, 391, 374

(56) References Cited

U.S. PATENT DOCUMENTS

| | | | | |
|---|---|---|---|---|
| 1,830,580 | * | 11/1931 | Wappat | 30/376 |
| 2,586,530 | * | 2/1952 | Godfrey | 30/388 |
| 2,761,474 | | 9/1956 | Dolan | 143/43 |
| 2,795,048 | * | 6/1957 | Doerner | 30/391 |
| 2,819,742 | * | 1/1958 | Blachly | 30/373 |
| 3,242,953 | | 3/1966 | McCarty et al. | 143/43 |
| 3,262,472 | | 7/1966 | McCarty et al. | 143/43 |
| 3,292,673 | * | 12/1966 | Gregory | 30/377 |
| 3,977,080 | * | 8/1976 | Allaire | 30/166 |
| 4,221,051 | | 9/1980 | Glass | 30/377 |
| 4,414,743 | | 11/1983 | Pioch et al. . | |
| 4,450,627 | | 5/1984 | Morimoto . | |
| 4,516,324 | | 5/1985 | Heininger, Jr. et al. | 30/377 |
| 4,693,008 | | 9/1987 | Velie | 30/390 |
| 4,856,394 | | 8/1989 | Clowers | 83/56 |
| 4,870,758 | | 10/1989 | Fushiya | 30/388 |
| 4,982,501 | | 1/1991 | Sauerwein et al. | 30/376 |
| 5,075,976 | | 12/1991 | Young | 30/391 |
| 5,121,545 | | 6/1992 | Nonaka et al. | 30/376 |
| 5,239,756 | | 8/1993 | Matzo et al. | 30/371 |
| 5,375,495 | | 12/1994 | Bosten et al. . | |
| 5,381,602 | * | 1/1995 | Matzo et al. | 30/377 |
| 5,481,806 | * | 1/1996 | Pratt | 30/391 |
| 5,822,864 | * | 10/1998 | Campbell et al. | 30/390 |
| 5,873,169 | * | 2/1999 | James et al. | 30/391 |
| 5,911,482 | * | 6/1999 | Campbell et al. | 30/390 |
| 5,924,207 | | 7/1999 | Price et al. . | |
| 6,055,734 | * | 5/2000 | McCurry et al. | 30/391 |
| 6,108,916 | * | 8/2000 | Zeiler et al. | 30/391 |

FOREIGN PATENT DOCUMENTS

| | | |
|---|---|---|
| 3421003 | 12/1985 | (DE) . |
| 0810072 | 12/1997 | (EP) . |
| 2323810 | 10/1998 | (GB) . |

* cited by examiner

*Primary Examiner*—Rinaldo I. Rada
*Assistant Examiner*—Kim Ngoc Tran
(74) *Attorney, Agent, or Firm*—Michael Best & Friedrich LLP

(57) ABSTRACT

A circular saw having an improved line-of-sight. The circular saw comprises a motor for rotatably driving a saw blade about an axis to cut a workpiece, a bevel angle being defined between the cutting plane of the saw blade and a surface of the workpiece, a housing supporting the motor; a shoe plate supporting the circular saw on the workpiece to be cut, the shoe plate being pivotably connected to the housing to adjust the bevel angle; a main handle supported by the housing; an auxiliary handle supported by the housing; and an indicator for indicating the bevel angle. Preferably, the main handle, the auxiliary handle and the indicator are arranged so that, in the cutting position, the operator can view the saw blade as the saw blade cuts the workpiece and can view the indicator. The operator holds the main handle with one hand and the auxiliary handle with the other hand. When the operator holds the auxiliary handle with the other hand, the operator's other hand and the auxiliary handle do not obscure the operator's view of the saw blade as the saw blade cuts the workpiece.

16 Claims, 5 Drawing Sheets

CIRCULAR SAW

This application claims the benefit of prior filed co-pending provisional patent application, Ser. No. 60/096,522, filed on Aug. 14, 1998.

BACKGROUND OF THE INVENTION

The present invention relates to circular saws, and, more particularly, to a circular saw having an improved line-of-sight for the operator.

A typical circular saw includes a housing supporting a motor which rotatably drives a saw blade. The housing also forms a blade guard covering the upper portion of the saw blade. A shoe plate supports the circular saw on the surface of a workpiece. The circular saw also includes a main operator's handle mounted on the motor housing and an auxiliary handle supported on the housing or the shoe plate. Due to the arrangement of the components of the circular saw, only a portion of the outward face of the saw blade is generally visible as the saw blade cuts the workpiece.

During cutting operations, the operator typically grasps the main handle with one hand (the right hand) and grasps the auxiliary handle with the other hand (the left hand). In an optimal cutting position, the operator holds the circular saw so that the circular saw is centered relative to the operator's body. However, to view the saw blade as the saw blade cuts the workpiece, the operator must stand in a position so that the outward face of the saw blade is visible. To do so, the operator must lean over the outward face of the saw blade (generally on the right side of the circular saw).

In some circular saws, the shoe plate is pivotally connected to the housing so that the angle at which the saw blade cuts the workpiece (the bevel angle) is adjustable. Typically, the circular saw includes an indicator located toward the front of the circular saw and indicating the bevel angle of the saw blade.

In some constructions, the indicator faces the front of the circular saw, away from the operator. To view such a front indicator, the operator must hold the circular saw so that the front of the circular saw faces towards the operator.

In some other constructions, the indicator faces towards one side of the circular saw (the left side, opposite the outward face of the saw blade) and is generally parallel with the edge of the shoe plate. To view such a side-facing indicator, the operator must hold the circular saw so that the side of the circular saw faces towards the operator.

SUMMARY OF THE INVENTION

One problem with the above-described circular saw is that, to view the saw blade as the saw blade cuts the workpiece, the operator must be in a position to view the outward face of the saw blade below the blade guard. The operator must lean across their body to the outward side of the circular saw to view the saw blade. In this position, the operator is not in the optimal cutting stance, centered behind the circular saw, and is not holding the circular saw in the optimal cutting position. This position is awkward, and the operator's stance may not be balanced. Also, because the operator's body weight is not centered behind the circular saw, the operator has less precise control of the circular saw. In addition, the operator is in a relatively exposed position and may be hit by debris cut by the saw blade.

One problem with the above-described circular saws including a bevel angle adjustment assembly is that, in order to adjust the bevel angle, the operator must move from the cutting position, in which the saw blade is visible, to a position in which the bevel angle indicator is visible and in which the saw blade is no longer visible. The operator must then move back to the cutting position to resume cutting operators. These movements decrease the operator's efficiency during combined straight and bevel cutting operations.

Another problem with the above-described circular saw including a bevel angle adjustment assembly is that, as the housing is moved relative to the shoe plate to change the bevel angle of the saw blade, the upper blade guard is moved outwardly and downwardly toward the surface of the workpiece. In a beveled cutting position (i.e., 45° bevel angle), the upper blade guard obscures the operator's view of the outward face of the saw blade as the saw blade cuts the workpiece. In order to view the saw blade, the operator lean further outwardly and downwardly, increasing the awkwardness and imbalance in the operator's stance during cutting operations.

The present invention provides a circular saw with an improved line-of-sight to alleviate the problems with the above-described circular saws. The invention provides a circular saw in which the operator can view the saw blade as it cuts the workpiece while maintaining a comfortable and balanced stance and while holding the circular saw in an optimal cutting position. The components of the circular saw are arranged so that the operator can view the inward face of the saw blade (the face of the saw blade facing a substantial portion of the circular saw). The operator can remain in a centered behind the circular saw during cutting operations.

Also, the present invention provides a circular saw including a bevel angle adjustment assembly having a bevel angle indicator which is visible to the operator while the operator is in the optimal cutting stance with the circular saw in the optimal cutting position. Preferably, the bevel angle indicator is visible to the operator generally along the operator's line-of-sight of the saw blade.

One advantage of the present invention is that, while viewing the saw blade as it cuts the workpiece, the operator can maintain the optimal cutting stance and hold the circular saw in the optimal cutting position. The operator can thus maintain a comfortable and balanced stance, have more precise control of the circular saw during cutting operations, and be less exposed to debris. Also, the addition of the air flow directing means in the area of the operator's line-of-sight controls the flow of debris cut by the saw blade, further reducing the operator's exposure to this debris.

Another advantage of the present invention is that, because the bevel angle indicator is visible to the operator in the optimal cutting stance and with the circular saw in the optimal cutting position, the operator can adjust the bevel angle of the saw blade while maintaining the optimal stance and cutting position. This increases the efficiency of combined straight and bevel cutting operations.

A further advantage of the present invention is that, during bevel cutting operations (i.e., with the saw blade in a 45° bevel angle position), the operator's line-of-sight of the saw blade as it cuts the workpiece is not obscured and does not require the operator to adjust their stance.

Other features and advantages of the invention will become apparent to those skilled in the art upon review of the following detailed description, claims and drawings.

Figure 1:
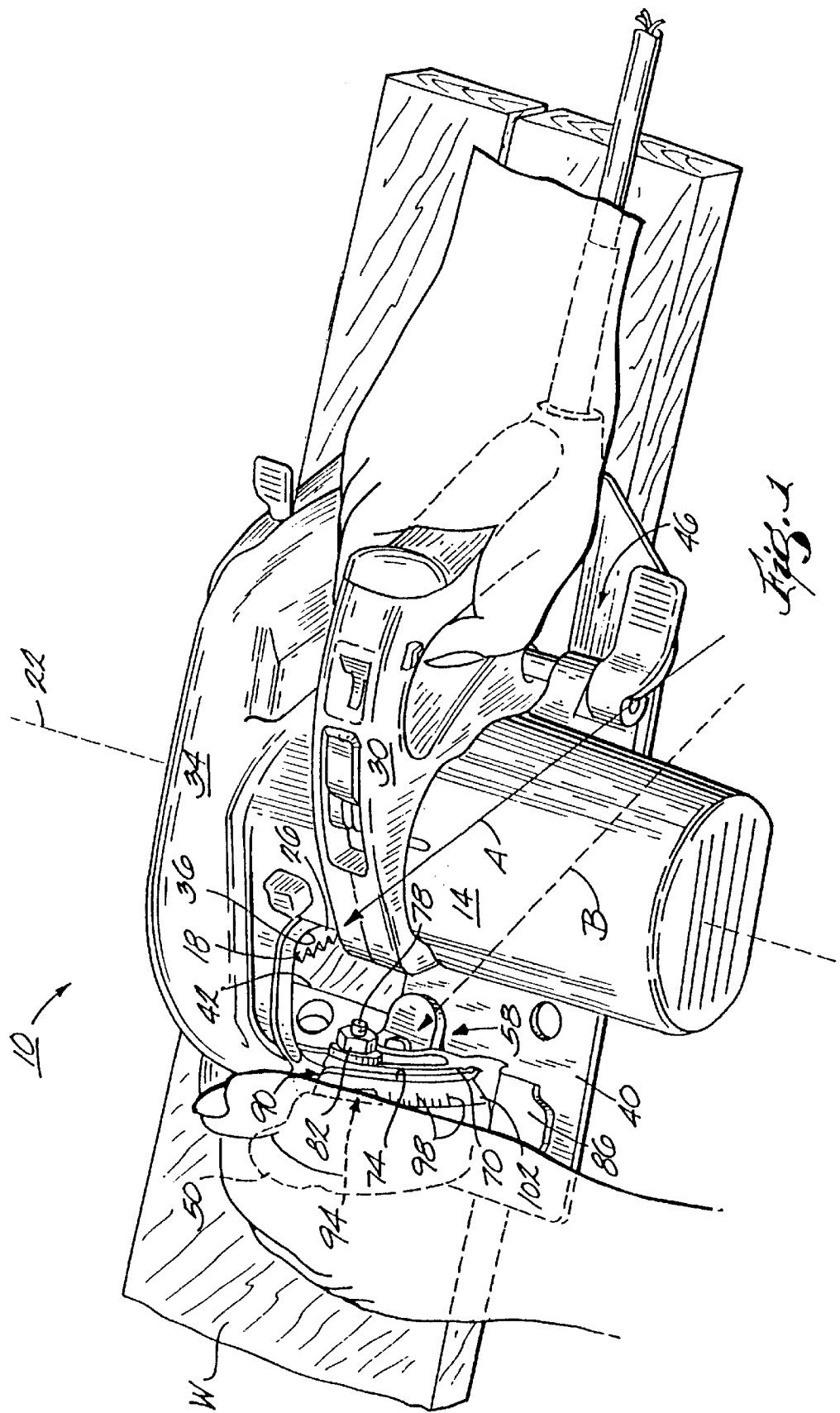
FIG. 1 is a perspective view of a circular saw embodying the invention and illustrating the circular saw as the saw blade cuts a workpiece.

Before one embodiment of the invention is explained in detail, it is to be understood that the invention is not limited in its application to the details of the construction and the arrangements of the components set forth in the following description or illustrated in the drawings. The invention is capable of other embodiments and of being practiced or carried out in various ways. Also, it is understood that the phraseology and terminology used herein is for the purpose of description and should not be regarded as limiting.

DETAILED DESCRIPTION OF THE PREFERRED EMBODIMENT

A circular saw 10 embodying the invention is illustrated in FIG. 1. The circular saw 10 includes a motor housing 14 supporting an electric motor (not shown). The motor is connectable to a power source and is operable to rotatably drive a saw blade 18 about an axis 22 to cut a workpiece W. The saw blade 18 defines a cutting plane and has an inward face 26 and an outward face (not shown) facing opposite the inward face 26. The inward face 26 of the saw blade 18 faces toward a substantial portion of the circular saw 10. A main operator's handle 30 is supported on the housing 14. An on/off switch (not shown) is supported on the main handle 30 and selectively connects the motor to the power source.

A fixed blade guard 34 surrounds an upper portion of the saw blade 18. An opening 36 is formed on the forward inward side of the blade guard 34 through which the inward face 26 of the saw blade 18 is visible. Preferably, air flow control means are provided adjacent the opening 36 to control the flow of air and debris cut by the saw blade 18 and to substantially prevent debris from flowing through the opening 36. In the illustrated construction, the air flow control means are provided by a tooth 37 supported by and, preferably, formed with the fixed blade guard 34. The tooth 37 substantially directs the flow of air and debris away from the opening 36.

A movable guard 39 (see FIG. 3) selectively covers the lower portion of the saw blade 18. The guards 34 and 39 are arranged so that a portion of the outward face (not shown) of the saw blade 18 is visible during cutting of the workpiece.

The circular saw 10 also includes a shoe plate 40 connected to the housing 14 and supporting the circular saw 10 on the surface of the workpiece W. A portion of the saw blade 18 is extendable through an aperture 42 defined in the shoe plate 40.

In the illustrated construction, the circular saw 10 includes a front pivot depth adjustment assembly 46 (partially shown) to adjust the depth of cut of the saw blade 18. In other constructions (not shown), the circular saw 10 may include, for example, a rear depth adjustment assembly or a drop shoe depth adjustment assembly rather than the front pivot depth adjustment assembly 46. However, it should be understood that the present invention applies to a circular saw with any type of depth adjustment assembly or with no depth adjustment assembly.

Figure 2:
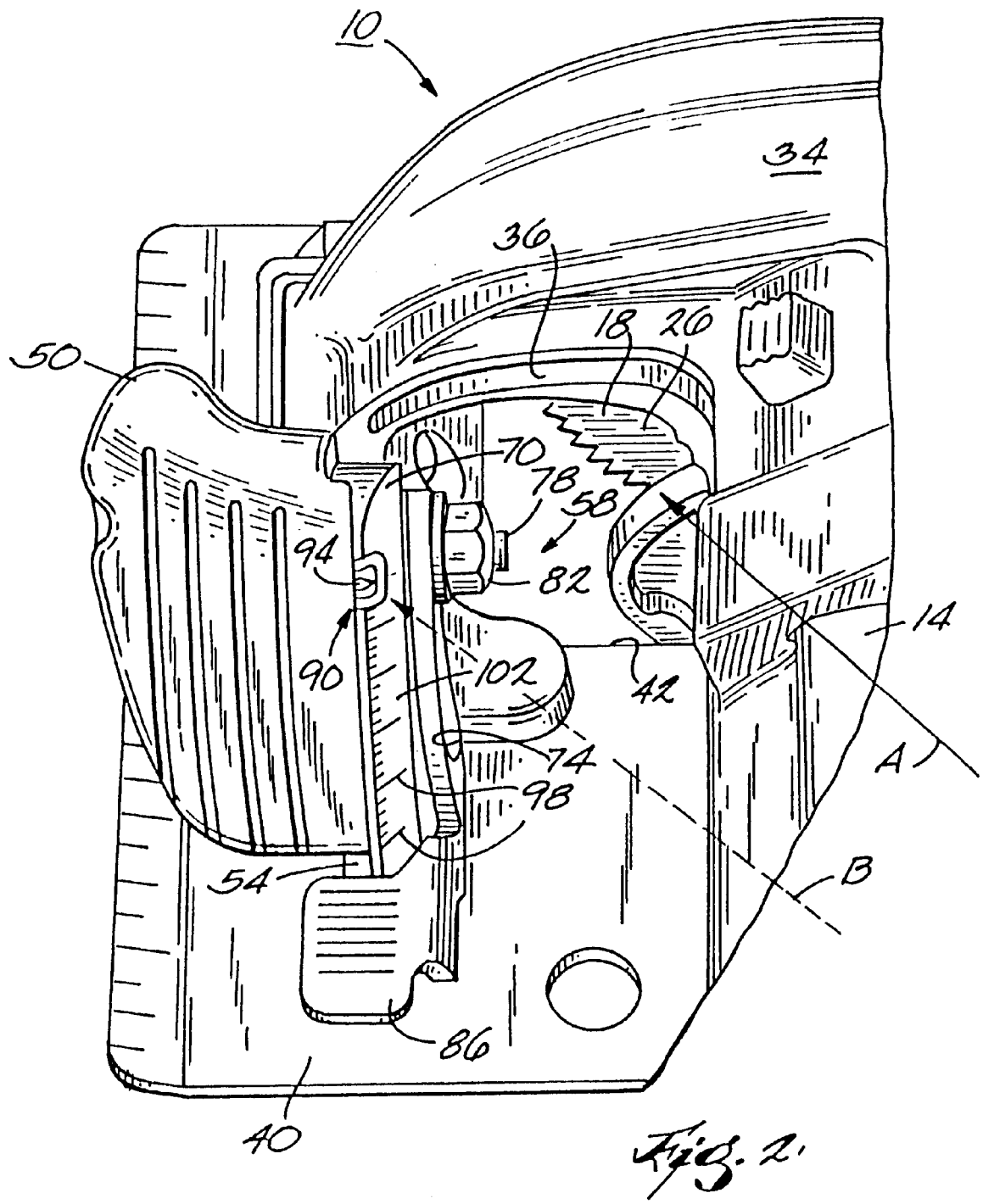
FIG. 2 is an enlarged view of the forward portion of the circular saw shown in FIG. 1.

The circular saw 10 also includes an auxiliary handle 50 supported on the forward portion of the circular saw 10. In the illustrated construction, a support post 54 (see FIGS. 2–4) extends upwardly from the shoe plate 40, and the auxiliary handle 50 is fixed to the support post 54. In other constructions (not shown), the auxiliary handle 50 may be supported on the circular saw 10 in a different manner while complying with the teachings of the present invention.

In the illustrated construction, the circular saw 10 includes (see FIGS. 1–4) a bevel angle adjustment assembly 58 for adjusting the angle between the cutting plane of the saw blade 18 relative to the surface of the workpiece W (the bevel angle). It should be understood that the present invention, with respect to the operator's line-of-sight of the saw blade 18 as the saw blade 18 cuts the workpiece W (as explained in more detail below), also applies to a circular saw in which the bevel angle of the saw blade is not adjustable.

The bevel angle adjustment assembly 58 pivotally connects the shoe plate 40 to the housing 14. The bevel angle adjustment assembly 58 includes (see FIG. 3) a pivot member 62 pivotally connecting the shoe plate 40 to the guard 30 for movement about a pivot axis 66.

The bevel angle adjustment assembly 58 also includes (see FIGS. 1, 2 and 4A–C) a bevel plate 70 connected to the housing 14 through the guard 34 so that the bevel plate 70 is movable with the housing 14 relative to the shoe plate 40. As shown in FIG. 1, an arcuate groove 74 is defined in the bevel plate 70.

A connecting member or fastener 78 (see FIGS. 1–4) extends through the support post 54 and through the arcuate groove 74 in the bevel plate 70 to connect the support post 54 to the bevel plate 70. A left-threaded locking nut 82 is threadedly connected to the fastener 78 and is operable to apply a clamping force to the bevel plate 70 to fix the bevel plate 70 to the support post 54.

The bevel angle adjustment assembly 58 also includes a locking lever 86 connected to the nut 82. The locking lever 86 is movable between a locking position (see FIGS. 1, 2, and 4A and as shown in solid lines in FIG. 3), in which the bevel angle of the saw blade 18 is fixed, and an unlocked position (see FIGS. 4B–C and as shown in phantom lines in FIG. 3), in which the bevel angle of the saw blade 18 is adjustable. The nut 82 is attached to the rearward end of the fastener 78 so that the lever 86 does not interfere with the auxiliary handle 50 during adjustment of the bevel angle adjustment assembly 58.

In the locked position (shown in FIGS. 1, 2 and 4A and in solid lines in FIG. 3), the nut 82 applies a clamping force to the bevel plate 70 so that the bevel plate 70 is fixed to the support post 54. The housing 14 is fixed relative to the shoe plate 40, and the bevel angle of the saw blade 18 is fixed.

In the unlocked position, the nut 82 does not apply a clamping force to the bevel plate 70, and the fastener 78 is movable in and along the arcuate groove 74. The bevel plate 70 is movable relative to the support post 54, and the housing 14 is movable relative to the shoe plate 40 to adjust the bevel angle of the saw blade 18.

The bevel angle adjustment assembly 58 also includes an indicator 90 for indicating the bevel angle of the saw blade 18. The indicator 90 includes a first indicator member or pointer 94 fixed to the shoe plate 40. In the illustrated construction, the pointer 94 is connected to the auxiliary handle 50.

The indicator 90 also includes a plurality of second indicator members 98 fixed to the housing 14. In the illustrated construction, the second indicator members 98 are formed on a scale 102 formed on the bevel plate 70. The scale 102 is oriented at an angle relative to the side edge of the shoe plate 40 and faces generally rearwardly and outwardly relative to the circular saw 10. To indicate the bevel angle, the pointer 94 is aligned with one of the second indicator members 98.

It should be understood that, in other constructions, the bevel angle adjustment assembly 58 may include other components and arrangements while complying with the teachings of the present invention.

Figure 3:
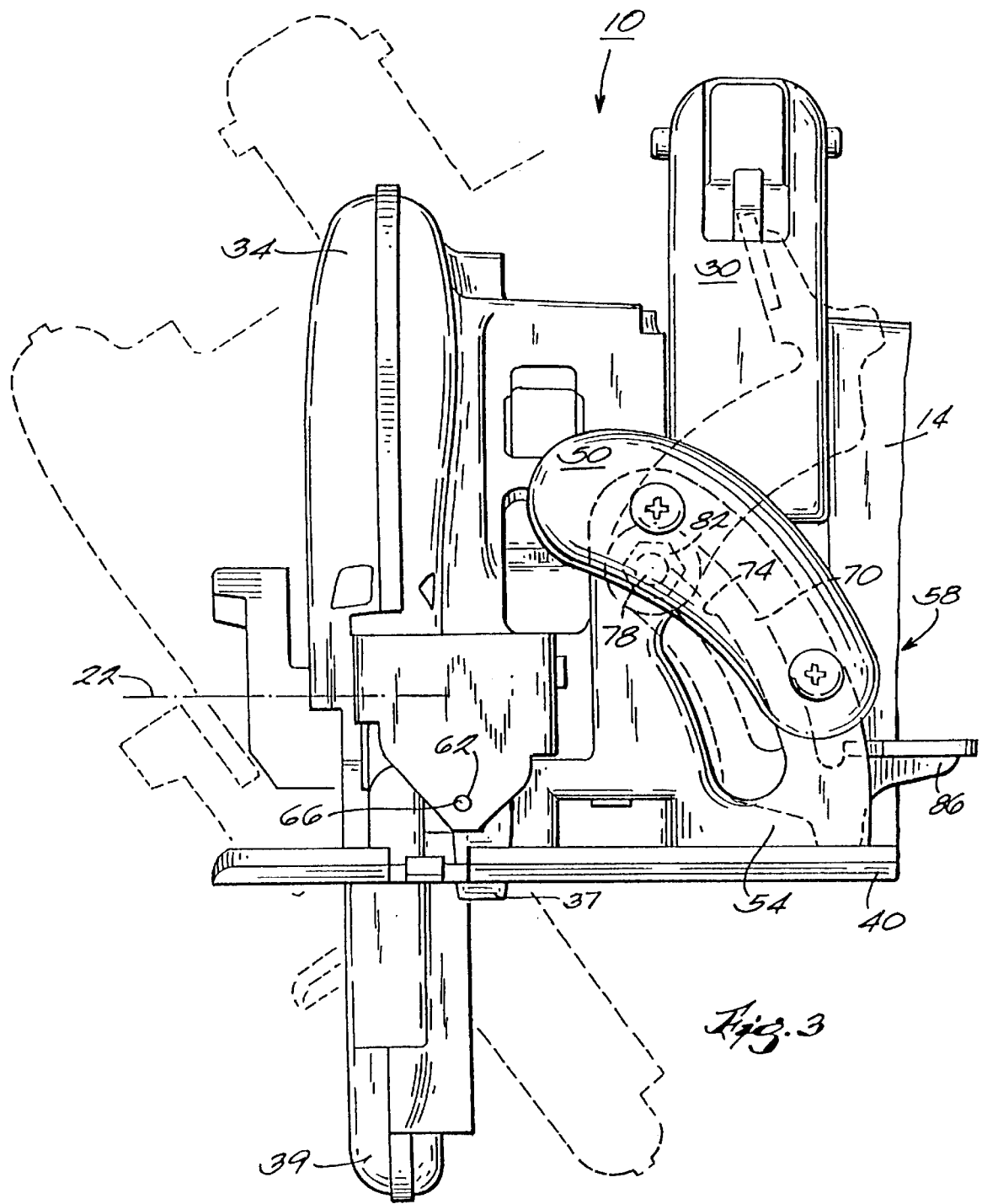
FIG. 3 is a front view of the circular saw shown in FIG. 1 and illustrating the adjustment of the bevel angle of the saw blade.
Figure 4A:
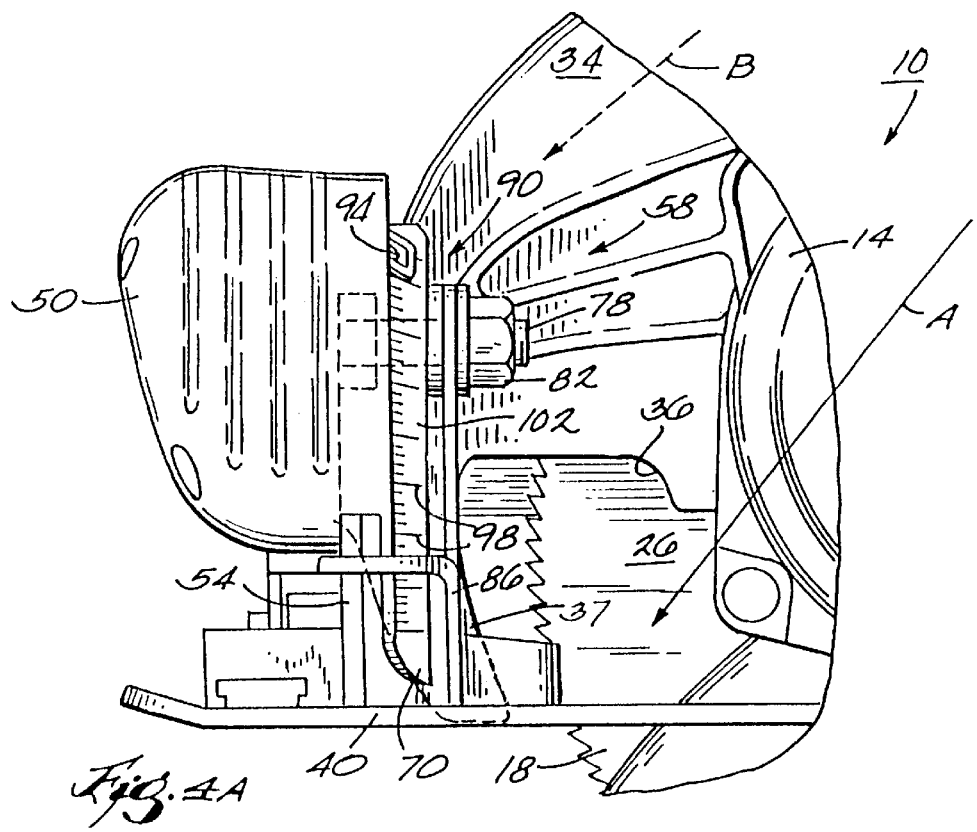
FIGS. 4A–C are enlarged side views of the forward portion of the circular saw shown in FIG. 1 and illustrating the adjustment of the bevel angle of the saw blade.
Figure 4B:
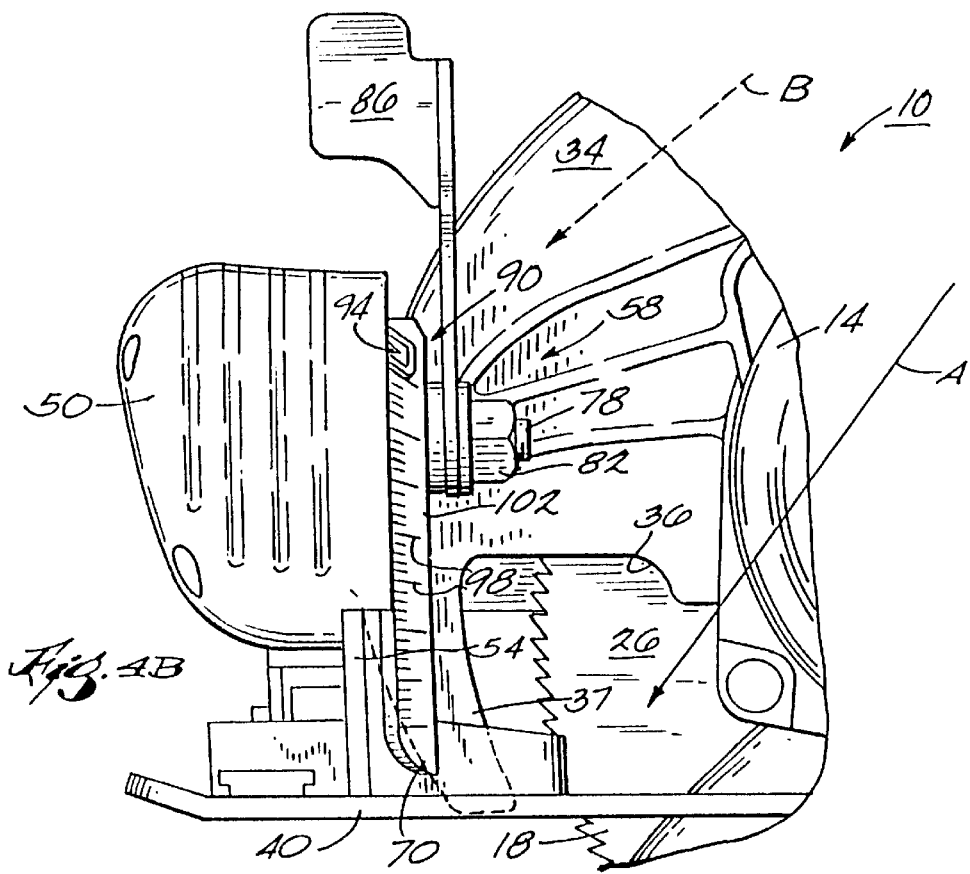
Figure 4C:
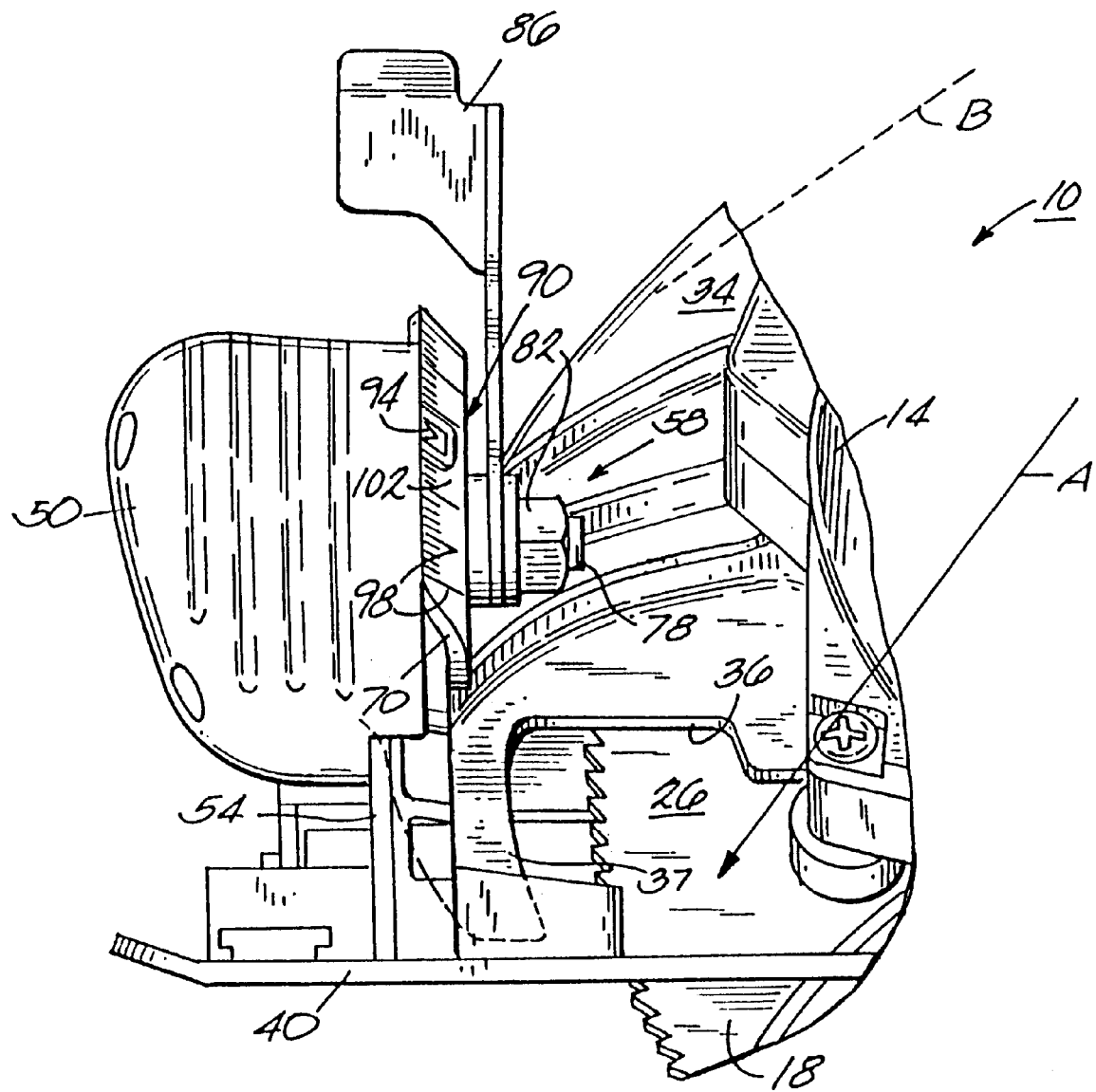

To adjust the bevel angle of the saw blade 18, the lever 86 is moved from the locked position (shown in FIGS. 1, 2 and 4A and as shown in solid lines in FIG. 3) to the unlocked position (shown in FIGS. 4B–C and as shown in phantom lines in FIG. 3). The housing 14 is moved relative to the shoe plate 40 until the saw blade 18 is in the desired bevel angle position (as indicated by the pointer 94 alignment with the selected second indicator member 98). Once the operator has positioned the saw blade 18 in the desired bevel angle position, the locking lever 86 is moved to the locked position so that the nut 82 clamps the bevel plate 70 to the support post 54.

During cutting operations, as shown in FIG. 1, the operator grasps the main handle 30 with the right hand and grasps the auxiliary handle 50 with the left hand. The operator maintains a centered position relative to the circular saw 10. This position is the operator's optimal cutting stance and the optimal cutting position for holding the circular saw 10.

The operator's line-of-sight is indicated by arrow A. In the optimal cutting stance and cutting position, the operator can view the inward face 26 of the saw blade 18 through the opening 36 in the inward side of the blade guard 34. The components of the circular saw 10, such as the housing 14, the auxiliary handle 50, the support post 54 and the components of the bevel angle adjustment mechanism 58 are arranged so that an open space is formed and so that the inward face 26 of the saw blade 18 is visible through the open space as the saw blade 18 cuts the workpiece W. The operator's left hand and the auxiliary handle 50 do not obscure the operator's line-of-sight.

With the operator in this optimal cutting stance and cutting position, the operator is not as directly exposed to debris cut by the saw blade 18. The air flow control means, in the form of the tooth 37, further reduces the operator's exposure to debris by substantially preventing the debris from flowing through the opening 36 into the open space.

It should be understood that the components of the circular saw 10 can be arranged in other locations so long as the operator's line-of-sight of the saw blade 18 as the saw blade 18 cuts the workpiece W is generally maintained.

As shown in FIG. 1, the operator's line-of-sight of the indicator 90 is indicated by arrow B. From the operator's point-of-view (while in the optimal cutting stance and with the circular saw 10 held in the optimal cutting position), the indicator 90 is visible along generally the same line-of-sight as indicated by arrow A. As a result, the operator can adjust the bevel angle adjustment assembly 58, as explained above, while generally maintaining the optimal cutting stance and optimal cutting position.

As shown in FIG. 4C, with the bevel angle adjustment assembly 58 adjusted for bevel cutting operations, the operator can still view the inward face 26 of the saw blade 18 through the opening 36 in the inward side of the blade guard 34 (along line-of-sight arrow A). Also, the indicator 90 is still visible along line-of-sight arrow B, generally the same line-of-sight of the saw blade 18 as the saw blade 18 cuts the workpiece W (arrow A). The operator can thus adjust the saw blade 18 between straight cutting and bevel cutting positions while maintaining the optimal cutting stance and optimal cutting position.

Various features of the invention are set forth in the following claims.

We claim:

1. A circular saw comprising:

a motor for rotatably driving a saw blade about an axis to cut a workpiece in a cutting direction, the saw blade having an inward face facing toward said motor and an outward face, the saw blade defining a cutting plane, a bevel angle being defined between the cutting plane of the saw blade and a surface of the workpiece;

a housing supporting said motor and defining an opening through which the inward face of the saw blade is visible;

a shoe plate supporting said circular saw on the workpiece to be cut, said shoe plate being pivotably connected to said housing to adjust the bevel angle;

a main handle supported by said housing;

an auxiliary handle supported by one of said housing and said shoe plate, wherein, in a cutting position and while cutting the workpiece with the saw blade, an operator holds said main handle with one hand and said auxiliary handle with the other hand, said main handle and said auxiliary handle being supported to provide visibility through said opening of the inward face of the saw blade, as the saw blade cuts the workpiece, to an operator from an operator's position rearward of said axis with respect to the cutting direction along a line-of-sight;

an indicator for indicating the bevel angle, said indicator being supported by at least one of said housing and said shoe plate, said indicator being supported to provide visibility of said indicator generally along the same line-of-sight; and an air flow control means supported adjacent said opening and controlling a flow of air and debris created by the saw blade wherein said air flow control means includes a tooth supported adjacent said opening to prevent the debris from flowing through said opening.

2. The circular saw as set forth in claim 1 and further comprising a bevel angle adjustment assembly pivotably connecting said shoe plate to said housing and operable to adjust the bevel angle, wherein said bevel angle adjustment assembly is adjustable by the operator from the operator's position rearward of said axis.

3. A circular saw comprising:

a motor for rotatably driving a saw blade about an axis to cut a workpiece in a cutting direction, the saw blade having an inward face facing toward said motor and an outward face;

a housing supporting said motor and defining an opening through which the inward face of the saw blade is visible;

a shoe plate connected to said housing and supporting said circular saw on the workpiece to be cut;

a main handle supported by said housing;

an auxiliary handle supported by one of said housing and said shoe plate, wherein, in a cutting position and while cutting the workpiece, an operator holds said main handle with one hand and said auxiliary handle with the other hand, said main handle and said auxiliary handle being supported to provide visibility through said opening of the inward face of the saw blade, as the saw blade cuts the workpiece, to an operator from an operator's position rearward of said axis with respect to the cutting direction; and an air flow control means supported adjacent said opening and controlling a flow of air and debris created by the saw blade, wherein said air flow control means includes a tooth supported adjacent said opening to prevent the debris from flowing through said openings.

4. The circular saw as set forth in claim 3 wherein said saw blade has opposite faces, wherein one of the opposite faces of the saw blade faces a substantial portion of said circular saw, and wherein, the one of the opposite faces of the saw blade is visible to the operator from the operator's position rearward of said axis as the saw blade cuts the work piece.

5. The circular saw as set forth in claim 3 wherein said auxiliary handle is supported so that, when the operator holds said auxiliary handle with the other hand, the operator's other hand and said auxiliary handle do not obscure the operator's view of the inward face of the saw blade through said opening as the saw blade cuts the work piece.

6. The circular saw as set forth in claim 3 wherein said auxiliary handle is supported by said shoe plate.

7. The circular saw as set forth in claim 6 and further comprising a support post supported on said shoe plate, wherein said auxiliary handle is supported on said support post, and wherein said support post and said auxiliary handle are supported by said shoe plate to provide visibility of the inward face of the saw blade through said opening to the operator from the operator's position rearward of said axis as the saw blade cuts the workpiece.

8. The circular saw as set forth in claim 7 wherein said auxiliary handle is supported by said shoe plate so that, when the operator holds said auxiliary handle with the other hand, the operator's other hand and said auxiliary handle to not obscure the operator's view of the inward face of the saw blade through said opening as the saw blade cuts the workpiece.

9. The circular saw as set forth in claim 7 wherein said support post is positioned relative to said housing to provide a space between said support post and said housing, and wherein the inward face the saw blade is visible through said space and through said opening.

10. The circular saw as set forth in claim 3 wherein, as the saw blade cuts the workpiece, the inward face of the saw blade is visible to the operator along a line-of-sight, wherein the saw blade defines a cutting plane, wherein a bevel angle is defined between the cutting plane of the saw blade and a surface of the workpiece, wherein said circular saw further comprises a bevel angle adjustment assembly pivotally connecting said shoe plate to said housing so that the bevel angle is adjustable, said bevel angle adjustment assembly including an indicator for indicating the bevel angle, and wherein said indicator is supported by at least one of said shoe plate and said housing to provide visibility of said indicator to the operator from the operator's position rearward of the axis along generally said line-of-sight of the inward face of the saw blade.

11. The circular saw as set forth in claim 10 wherein said indicator includes a first indicator member supported on one of said housing and said shoe plate, and a plurality of second indicator members supported on the other of said housing and said shoe plate, wherein said first indicator member is alignable with one of said plurality of second indicator members to indicate a first bevel angle, and wherein said first indicator member is alignable with another of said plurality of second indicator members to indicate a second bevel angle.

12. The circular saw as set forth in claim 11 wherein said first indicator member is supported by said shoe plate and said plurality of second indicator members are supported by said housing.

13. The circular saw as set forth in claim 11 wherein said indicator further includes a bevel plate having a surface on which said plurality of second indicator members are formed.

14. The circular saw as set forth in claim 13 wherein said surface of said bevel plate faces at least partially rearwardly with respect to the cutting direction.

15. The circular saw as set forth in claim 10 wherein said indicator faces at least partially rearwardly with respect to the cutting direction.

16. The circular saw as set forth in claim 10 wherein said shoe plate has opposite outer edges defining respective opposite vertical planes spaced apart along said axis, and wherein said indicator is visible to an operator from the operator's position rearward of said axis with respect to the cutting direction and between the opposite vertical planes.

* * * * *

UNITED STATES PATENT AND TRADEMARK OFFICE
CERTIFICATE OF CORRECTION

PATENT NO. : 6,301,789 B1
DATED : October 16, 2001
INVENTOR(S) : Jeffrey M. Zeiler et al.

It is certified that error appears in the above-identified patent and that said Letters Patent is hereby corrected as shown below:

Claim 3,
Line 8, "openings" should be -- opening --.

Claim 4,
Line 9, "said" should be -- the --.

Signed and Sealed this

Ninth Day of April, 2002

Attest:

Attesting Officer

JAMES E. ROGAN
Director of the United States Patent and Trademark Office